Sept. 18, 1962          W. A. BARY          3,054,579
AIRCRAFT WITH SLOW SPEED LANDING AND TAKE-OFF
Filed March 14, 1957          4 Sheets-Sheet 1
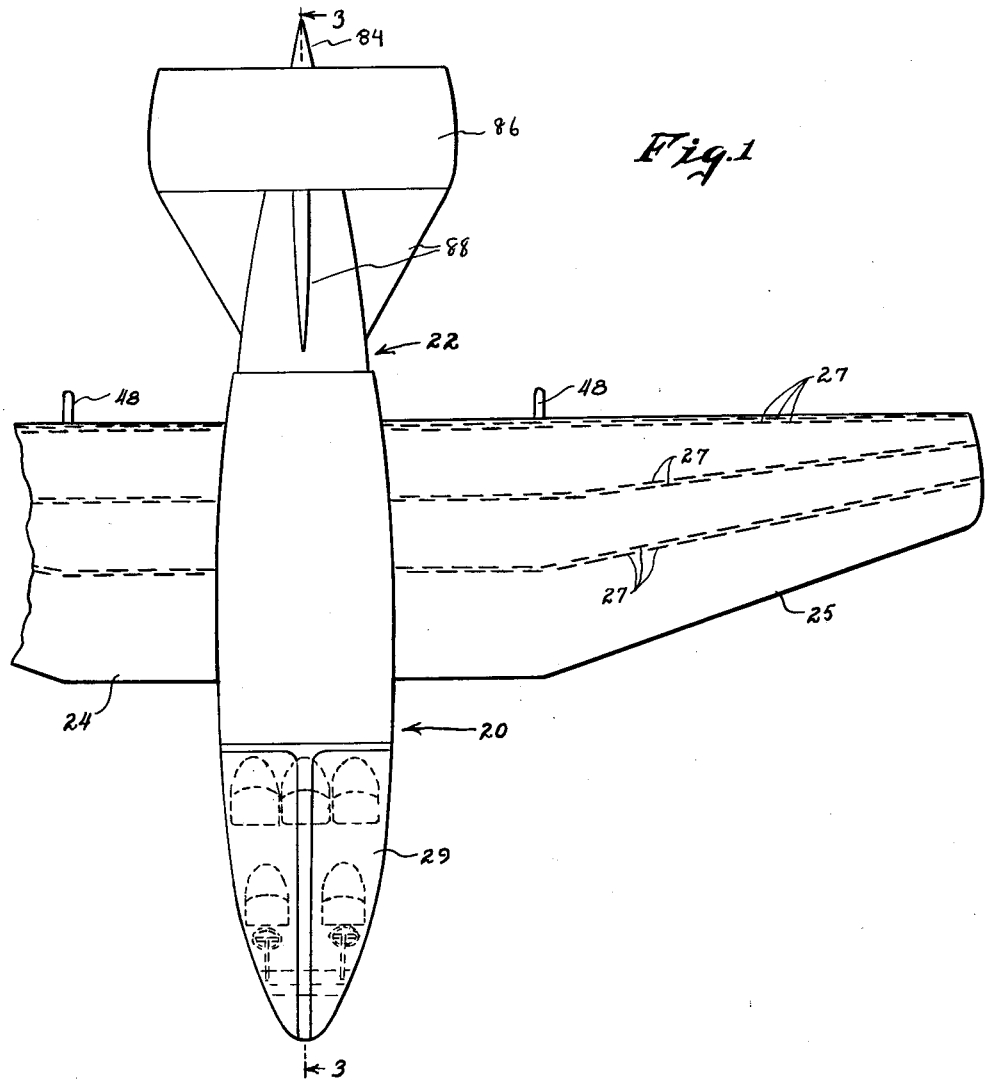
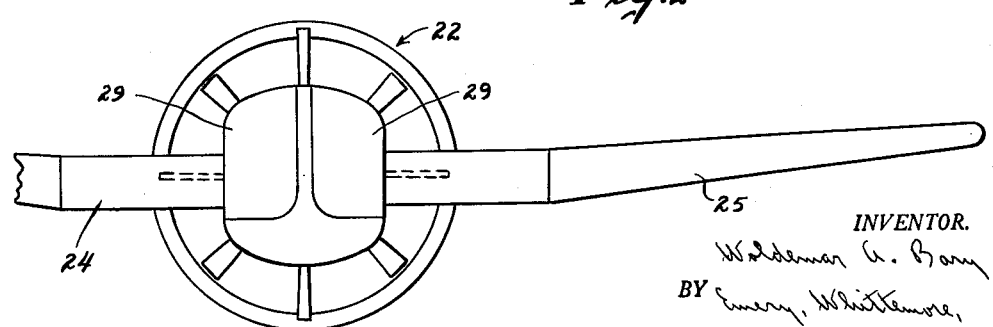

Sept. 18, 1962      W. A. BARY      3,054,579
AIRCRAFT WITH SLOW SPEED LANDING AND TAKE-OFF
Filed March 14, 1957      4 Sheets-Sheet 2
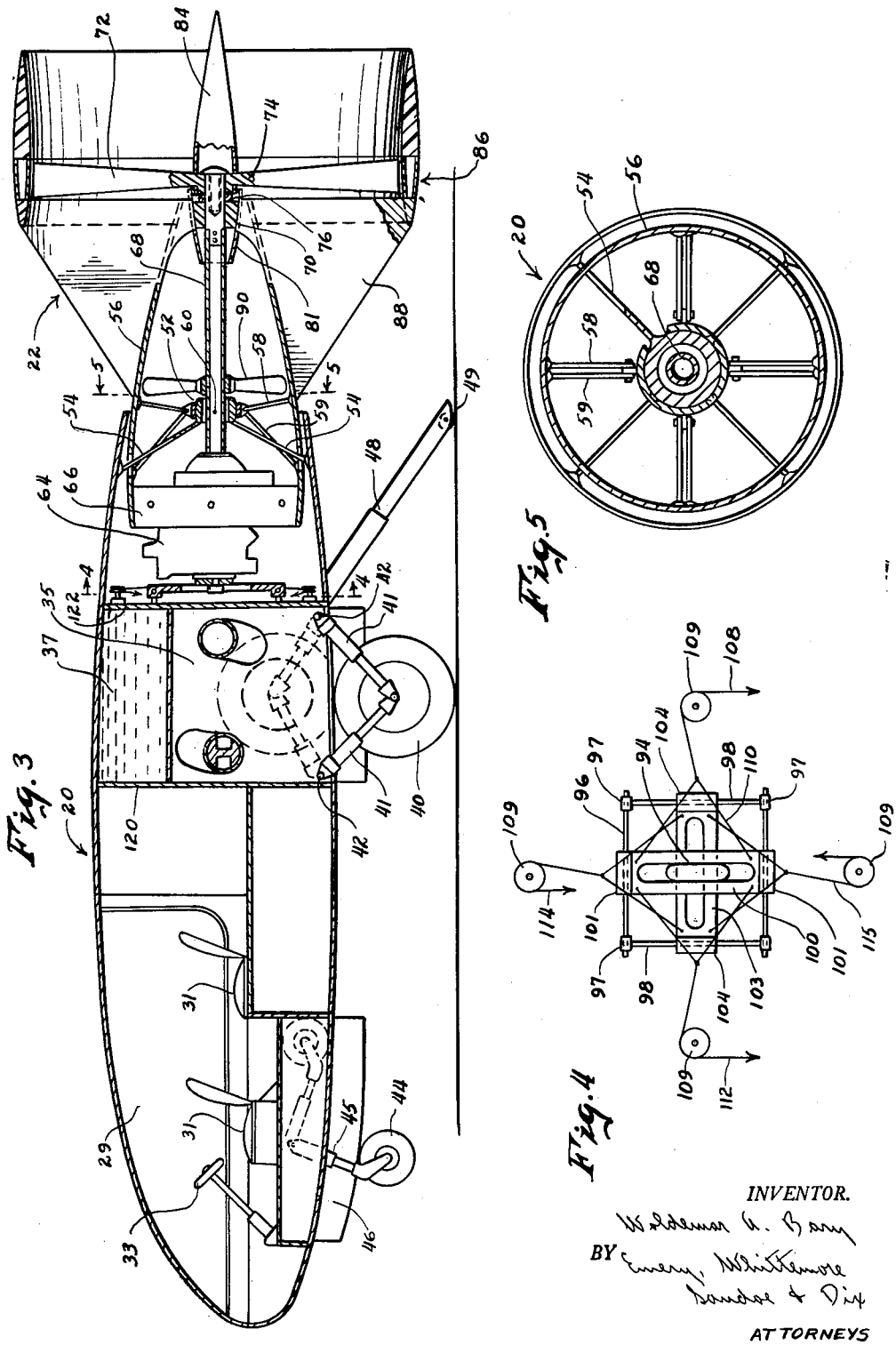
INVENTOR.
Waldemar A. Bary
BY Emery, Whittemore,
Danshof & Dix
ATTORNEYS

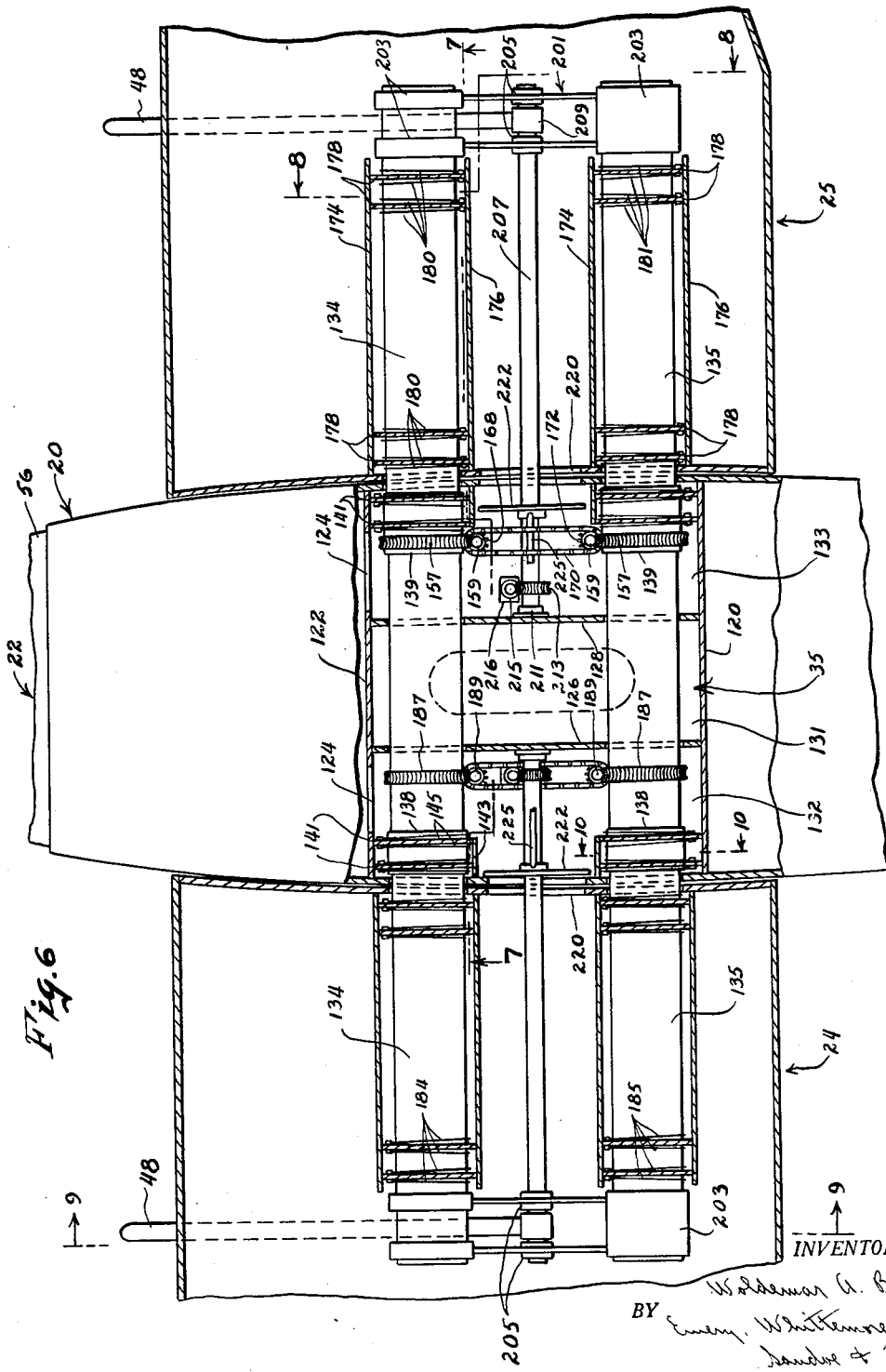

Sept. 18, 1962 W. A. BARY 3,054,579
AIRCRAFT WITH SLOW SPEED LANDING AND TAKE-OFF
Filed March 14, 1957 4 Sheets-Sheet 4
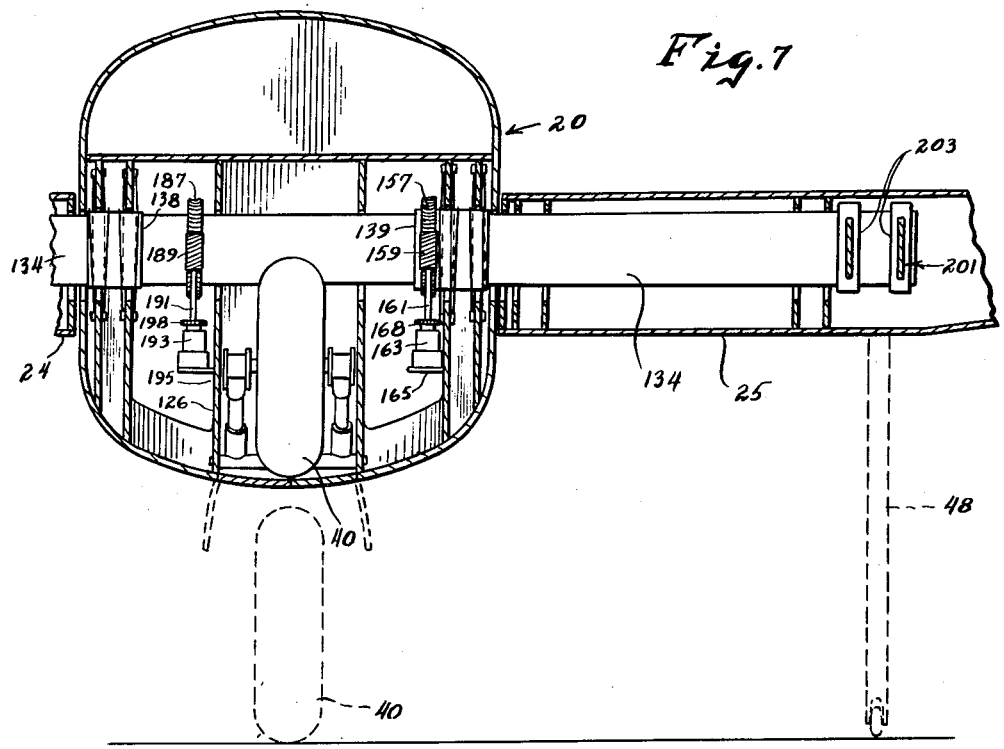
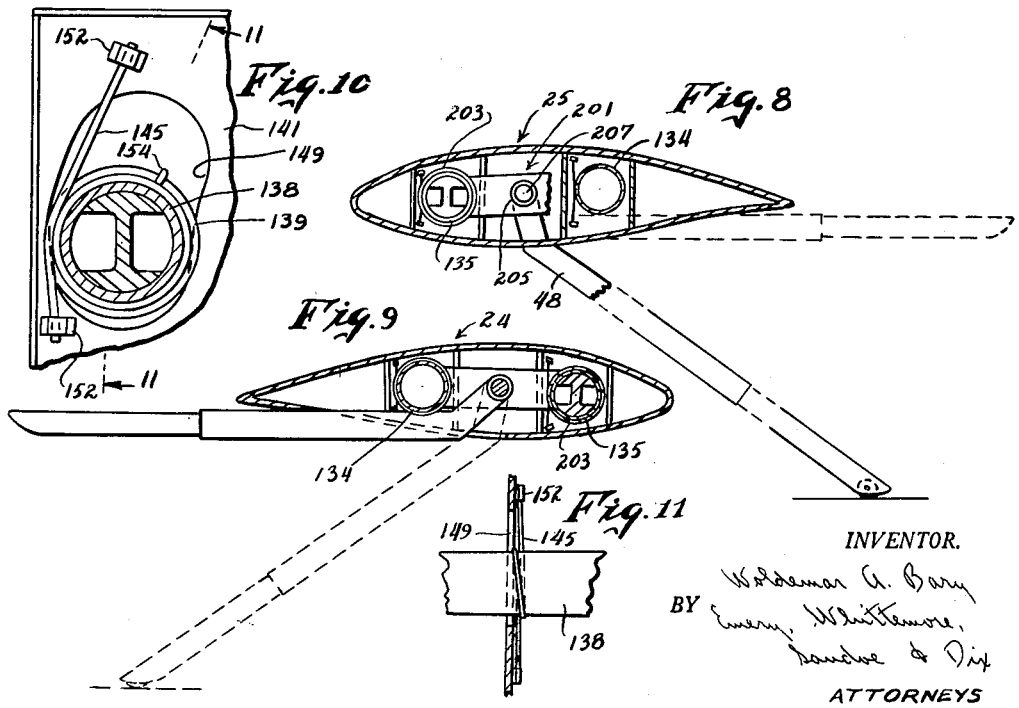
INVENTOR.
Waldemar A. Bary
BY Emery, Whittemore,
Dundee & Dix
ATTORNEYS

United States Patent Office 3,054,579
Patented Sept. 18, 1962

3,054,579
AIRCRAFT WITH SLOW SPEED LANDING
AND TAKE-OFF
Woldemar A. Bary, 60 East End Ave., New York, N.Y.
Filed Mar. 14, 1957, Ser. No. 646,079
8 Claims. (Cl. 244—42)

The present-day helicopter is indispensable for all kinds of emergency work, on short distances, but is practically excluded from the field of normal long distance and fast operation of fixed wing airplanes. The aim of this invention is to fill the gap between the two. This invention relates to a modified type of fixed wing airplane and more especially to a construction which permits slow flying speed and the use of short ground areas for landing and take-off; this without impairing the operation and performance of the airplane in flight, instead even improving its speed.

It is an object of the invention to provide an improved airplane with extremely slow and short landing, combined with short and steep take-off. These results are obtained by a high lift-wing with boundary layer control which prevents stalling at unusually high angles of attack.

Another object of the invention is to provide an airplane construction in which any required portion of the power of the airplane engine is available for suction of air into the wings at critical areas to obtain the proper boundary layer control, and with no additional power-equipment. This entails a new wing construction and a new correlation of the wings with the engine of the airplane so that the air stream generated to cool the engine can be used to produce suction in one or both wings selectively for high lift, low drag and lateral control, or with turbo-jet or turbo-prop engines, the air intake for the engine can be used to obtain the required amount of air suction from the wings.

Another object of the invention is to provide improved aerodynamic control for an airplane. The controls of this invention for both steering and elevation are to a large extent independent of the speed of the airplane, and they are effective when taxiing on the ground and for obtaining quick and effective response during landing and takeoff while the speed of the airplane is low. This improved control is obtained by a construction which permits the propeller, and preferably the engine and the entire tail assembly of the airplane also, to be moved angularly in either horizontal or vertical directions or with combinations of horizontal and vertical movement, to change the direction of the power thrust. Also the angular movement of the tail assembly causes the tail surfaces to serve as rudders or elevators.

Another feature of the control of this invention relates to the tilting of the wings with respect to the airplane fuselage so that the angle of attack can be changed for steep takeoff and landing without tilting the cabin in such a way as to interfere with the visibility of the ground to the pilot operating the airplane. The control includes another feature whereby the wings can be tilted simultaneously in opposite directions selectively to obtain aileron-like effect, and the suction for boundary layer control cooperates with the selective tilting of the wings for lateral control. Also a minimum drag wing setting can be made in flight, so as to answer different flight condition such as altitude, speed and loading.

Another object of the invention is to provide an improved type of landing gear for a slow takeoff and landing speed airplane of the character indicated; the landing gear being particularly adapted for landing on rough ground where there are no prepared runways. One wheel take-off and landing eliminates the possibility of a ground loop from a stump, stone or hole. This makes the airplane of this invention ideally suited for landing and take-off on any open ground having an area free of trees or other obstructions.

Still another object of the invention is to provide a simplified monocoque construction which is inexpensive to construct and particularly suitable for use with the boundary layer control features of this invention. The construction is also suitable for manufacture from fibre glass to produce a strong, light and durable airplane by mass production methods with a minimum of components and with smooth surfaces.

Other objects, features and advantages of the invention will appear or be pointed out as the description proceeds.

In the drawing, forming a part hereof, in which like reference characters indicate corresponding parts in all the views;

FIGURE 1 is a fragmentary, top plan view of an airplane made in accordance with this invention;

FIG. 2 is a front elevation of the airplane shown in FIG. 1;

FIG. 3 is an enlarged, vertical sectional view taken on the line 3—3 of FIG. 1 with the balancing booms and the landing gear in their lowered positions;

FIG. 4 is a diagrammatic front view of the apparatus for changing the direction of power thrust, the view being taken at the plane 4—4 of FIG. 3 but with the locations of the parts shifted somewhat for clearer illustration;

FIG. 5 is an enlarged sectional view taken on he line 5—5 of FIG. 3;

FIG. 6 is a greatly enlarged sectional view looking down on the wing operating structure;

FIG. 7 is a sectional view taken on the line 7—7 of FIG. 6;

FIGS. 8 and 9 are reduced scale, diagrammatic sectional views showing the connection of the booms to the spars;

FIG. 10 is a fragmentary detail view showing the way in which one of the spars is connected to the fuselage of the airplane; and FIG. 11 is a sectional view on the line 11—11 of FIG. 10.

The aircraft, shown in FIG. 1, includes a fuselage 20, a tail section 22 pivotally connected to the fuselage, in a manner which will be explained in connection with the other views, and right and left wings 24 and 25, respectively. Each of the wings 24 and 25 is hollow. There is a cabin at the forward end of the fuselage with a frame and window unit 29 through which the pilot has good visibility in all directions. The frame and window unit 29 slides forward to open the cabin for entrance and exit of the pilot and passengers.

Referring again to FIG. 1, each of the wings 24 and 25 has rows of openings 27 at critical locations chordwise of the wing. In the wings illustrated, there are three rows of openings 27, preferably slots, at locations back from the leading edge, the rearmost row of openings being adjacent to the trailing edges of the wings. For greater structural strength, the individual openings 27 are arranged in staggered relation along the different rows. These openings 27 extend through the top surface of the wing and into the chamber formed by the hollow interior.

The concentration of openings 27, across the rearward portion of the top surface of the wing, is for the purpose of preventing burble formation especially at high angles of attack. By creating a reduced pressure within the wing, air is sucked through the openings 27 so as to prevent the boundary layer of air from breaking away from the top surface of the wing, and to reduce friction at high speeds.

FIG. 3 shows the construction of the fuselage 20 and the tail section 22. The fuselage includes seats 31 in a cabin, and the controls which are indicated diagrammatically by a wheel 33.

The fuselage has a compartment 35 divided into subcompartments by partitions which will be explained in connection with one of the other sectional views, and there are spaces for fuel 37 above the compartment 35.

The landing gear includes a main center wheel 40 supported on expandible shock absorbing struts 41 connected to the fuselage by pivot connections 42. This center wheel 40 and its supporting struts 41 retract into a center sub-compartment of the main compartment 35, as indicated in broken lines in FIG. 3.

The use of a single center wheel of relatively large diameter, such as the wheel 40, is particularly advantageous for landing and takeoffs on rough fields. The airplane can be balanced on this center wheel by manipulating the aerodynamic controls, but there are other elements of the landing gear for making the airplane stable on the ground. These other elements include a front caster wheel 44 at the lower end of a shock absorber 45 which retracts into a wheel compartment 46, as indicated in broken lines. No apparatus for retracting the landing gear is illustrated in the drawing because such apparatus is well understood in the art and its illustration is not necessary for a complete understanding of this invention.

The landing gear also includes two booms 48 which are widely spaced and which extend rearwardly for lateral and longitudinal stability. The booms have small wheels 49 at their lower ends. The purpose of the wheels 49 is to avoid scratching paved landing strips when the booms are used at airports. These booms 48 are pivotally connected with the wings and have torsional resilience at their wing connections so that the booms 48 move angularly to accommodate uneven surface of the ground. This connecting of the booms 48 to the airplane will be described in connection with the subsequent sectional views. Each of the booms 48 is preferably of telescopic construction so that the booms can be shortened, when in raised position, to avoid flutter at high speed.

The tail section 22 is connected with the fuselage by a ball and socket bearing 52. The inner convex portion of the bearing 52 is connected to the fuselage 20 by struts 54 located at angularly spaced regions around the longitudinal center line of the tail section 22. The concave portion of the bearing 52 is connected to a housing 56, of the tail section 22, by struts 58 and 59. The struts 58 extend radially and have some rearward component of extent, and they are angularly spaced from one another around the longitudinal center line of the tail section.

The struts 59 also extend radially and have a very substantial fore and aft component of direction. This construction provides a universal connection between the fuselage 20 and the tail section 22; and the center of curvature of the ball and socket bearing 52, which center is indicated by the reference character 60, is the point about which the tail section 22 swings with universal movement.

An engine 64 is connected to the forward end of the housing 56 by an engine mounting 66 which makes the engine an integral part of the tail section 22. A drive shaft 68 extends from the engine 64 rearwardly to a bearing 70 carried by the rearward end of the housing 56. This bearing 70 is rigidly connected to the housing 56 and it provides for both the radial and thrust load from a propeller 72 located just beyond the end of the housing 56.

The propeller 72 is attached to a shaft 74 which extends into the drive shaft 68, preferably with some longitudinal telescoping movement. There is a thrust bearing 76 between the hub of the propeller 72 and the bearing 70. This thrust bearing 76 transmits the thrust of the propeller to the bearing 70, and from the bearing 70 through the housing 56 to the struts 58 and 59. This thrust is transmitted through the ball and socket bearing 52 to the struts 54 which transmit the thrust directly to the fuselage 20 by which the airplane wings are carried.

By having the shaft 74 telescope into the shaft 78, with appropriate key or polyganal sections for transmitting rotary motion without interfering with the longitudinal telescoping motion, the drive shaft 68 is kept free of propeller thrust, and this reduces vibration by limiting any tendency of the shaft 68 to bend off center as a result of compressive loading.

There is a cover 81 over the bearing 70 to provide fairing for the air stream in the housing 56. This fairing is carried by the housing 56 and has running clearance from the drive shaft 68 and the propeller 72. Behind the cover 81 there is a tapered hub 84. This hub is carried by and rotates with the propeller.

The propeller 72 is surrounded by a stationary ring 86 connected to the housing 56 by fins 88 and forming an integral part of the tail section 22. This ring 86 provides a protection around the propeller. It also reduces the noise from the propeller and improves the aerodynamic performance by eliminating the spill of air at the propeller tips and by directing the air stream in the most useful direction. The ring 86 is of air foil cross section to reduce its drag and it is preferably of a light plastic construction.

An auxiliary propeller 90 is attached to the drive shaft 68 at a location just behind the engine 64 and bearing 52. This auxiliary propeller 90 has a diameter slightly less than the inside diameter of the housing 56 at the location where the propeller 90 is located. The purpose of the propeller 90 is to create a strong flow of air for cooling the engine 64 and for producing a suction by drawing air out of the wings through the fuselage. After passing from the wings into the fuselage and cooling the engine and, being heat-expanded, the air is ejected through the propeller disk, accelerating the air-flow from the propeller and jointly raising the thrust. Practically all energy spent on air suction through the wing is recovered, either in additional thrust, or in reduction of drag created by air friction from burblings on the wing surface.

The fuselage 20 extends for a substantial distance around the forward end of the tail section 22, the rearward end of the fuselage 20 being approximately even with the point 60 about which the tail section 22 pivots. By having the surface of the housing 56 curved about a center on or near the point 60, the radial movement of the housing 56 with respect to the rearward end of the fuselage 20 is kept to a minimum. This permits the airplane to be constructed with a relatively small clearance between the housing 56 and the rearward end of the fuselage 20.

FIG. 4 shows the structure for tilting the tail section 22 about its pivot connection to the fuselage. A rectangular stud 94 is located at the forward end of the engine mount. It is preferably located on the longitudinal center line of the tail section. There are two horizontal guide bars 96 connected to the fuselage by brackets 97. These same brackets also connect vertical guide bars 98 to the fuselage. A vertical plate 100 has bearings 101 at its opposite ends and these bearings 101 slide along the guide bars 96. Another plate 103 has bearings 104 at its opposite ends and these bearings 104 slide along the vertical guide bars 98.

Each of the plates 100 and 103 is slotted to receive the stud 94. Horizontal movement of the plate 100 shifts the stud 94 horizontally and thus pivots the tail section of the airplane from right to left, or vice versa. In a similar manner, vertical movement of the plate 103 moves the stud 94 up or down to swing the tail section in a vertical direction. The portion of the stud 94 in the slot of plate 103 is of substantial length to provide long bearing surfaces for preventing the reaction torque of the propeller drive shaft from rotating the engine and the tail section to which the engine is connected.

By moving the plates 100 and 103 simultaneously and at selected speeds with respect to one another, the stud 94 can be moved in any direction. These movements of the plates 100 and 103 can be effected by any desired operating mechanism. In FIG. 4, a cable 108 passes around a pulley 109 and has branching ends 110 connected to one side of the plate 100 for pulling the plate 100 to the right in FIG. 4 when the stud 94 is to be shifted in that direction.

A similar control cable 112 extends around the pulley 109 and connects with the opposite side of the plate 100 for moving the plate 100 to the left. Other cables 114 and 115 extend around pulleys 109 located above and below the stud 94, and these cables 114 and 115 are connected with the upper and lower sides of the horizontal plate 103 for moving that plate when the stud 94 is to be given upward and downward components of motion. It will be understood that these cables 108, 112, 114 and 115 are merely representative of control means for swinging the tail section of the airplane in any desired direction to change the propeller thrust for steering and for elevation.

The compartment 35 is closed at its forward end by a vertical partition 120 (FIGURE 6), and there is a partition 122 across the rearward end of the compartment 35. This rearward partition 122 has openings 124 through which air is drawn from the compartment 35 into the portion of the fuselage behind that compartment. Between these partitions 120 and 122 there are chordwise extending partitions 126 and 128 which subdivide the compartment 35 into a center subcompartment 131 and two side subcompartments 132 and 133. The center subcompartment 131 is the housing for enclosing the wheel 140 when this wheel is retracted.

The wings 24 and 25 are attached to the fuselage 20 by spars 134 and 135. Each of these spars 134 and 135 extends through the fuselage 20 and for a substantial distance into each of the wings 24 and 25. The spar 134 extends through bearing sleeves 138 and 139; and these bearing sleeves extend through plates 141 secured at their rearward ends to the rearward partition 122, and secured at their forward ends to brackets 143 which are in turn rigidly connected to the fuselage 20. The bearing sleeves 138 and 139 are connected to these plates 141 by harnesses 145. One of the harnesses 145 will be described in detail in connection with FIGURE 10.

The forward spar 135 also extends through bearing sleeves similar to those for the rearward spar 134 and indicated by the same reference characters 138 and 139. These bearing sleeves 138 and 139 extend through plates 141 which are rigidly connected with the fuselage 20. The bearing sleeves 138 and 139 are attached to these plates 141 by harnesses 145 similar in construction to those used for the bearing sleeves 138 and 139 of the rearward spar 134.

One of the harnesses 145 for the forward spar 135 is shown in FIGURE 10. The bearing sleeve 138 extends through a slot 149 in the plate 141. This slot 149 is for the purpose of permitting relative movement of the bearing sleeve 13 and the fuselage, of which the plate 141 forms an integral part.

The harness 145 comprises a flexible tension element, here shown as a cable, wrapped around the bearing sleeve 138 for at least one turn. The opposite ends of the harness 145 are secured to the plate 141 by anchors 152. These anchors 152 may be clamp connections or any other desired expedient for firmly connecting the opposite ends of the harness 145 to the plate 141. A mid point on the harness 145 is connected to the bearing sleeve 138 by a clamp 154 or other securing means.

From the description of FIGURE 10, it will be apparent that rotation of the bearing sleeve 138 in a counterclockwise direction will cause it to roll upwardly along the harness 145; and conversely, rotation of the bearing sleeve 138 in a clockwise direction will cause it to roll downwardly along the harness 145.

Referring again to FIGURE 6, each of the bearing sleeves 139 has a worm wheel 157 secured thereto, and there is a worm 159 in position to engage each of the worm wheels 157.

The worm 159 for driving the worm wheel 157 on the rearward bearing sleeve 139 is shown in FIGURE 7. It is driven by a shaft 161 from an electric motor 163 attached to the fuselage by a bracket 165. In order to provide a clearer illustration, no bearings for the shaft 161 are illustrated in FIGURE 7, but it will be understood that bearings are provided in accordance with conventional machine design practice. The motor 163 is reversible to turn the bearing sleeve 139 in either direction; but when the motor 163 is not energized, the worm 159 locks the bearing sleeve 139 against rotation because the pitch of the worm 159 is low enough to make the worm drive irreversible, that is, torque of the worm wheel 157 cannot rotate the worm wheel 159.

There is a sprocket wheel 168 secured to the drive shaft 161. A chain 170 connects the sprocket wheel 168 with a similar sprocket wheel 172 on the driveshaft of the worm 159 which rotates the forward bearing sleeve 139.

There are vertical partitions 174 extending from the top to the bottom of the wing 25 within the hollow interior of the wing. These partitions 174 are located rearwardly of the spars 134 and 135. There are other partitions 176 extending between the top and bottom of the wing 25 and located ahead of the spars 134 and 135. Chordwise partitions 178 extend between these partitions 174 and 176 to provide a rigid construction where the wing 25 is connected to the spars 134 and 135. There are harnesses 180 connecting the wing 25 to the spar 134 and similar harnesses 181 conencting the wing 25 to the forward spar 135. The number of harnesses used depends upon the size and strength of the cables or other flexible elements which are used to make the harnesses.

Each of the harnesses 180 and 181 is similar in construction to the harness 145 already described; but these harnesses 180 and 181 are conencted to the spars 134 and 135 respectively, instead of to the bearing sleeves that surround the spars as in the case of the harnesses 145.

On the other side of the fuselage 20, the wing 24 is connected to the spars 134 and 135 in the same way as already described for the wing 25 except that the harnesses that connect the wing 24 to the spars 134 and 135 are on the opposite sides of the spars from the harnesses 180 and 181 of the wing 25. These harnesses for connecting the wing 24 to the spar 134 are designated by the reference character 184 and those for the forward spar 135 are designated by the reference character 185.

In the description of the operation of the harnesses 145, the plates 141 to which the ends of the harnesses are connected were considered as fixed elements and the bearing sleeves 138 and 139 were considered as the movable elements which travel up and down with respect to the plates 141. In the case of the harnesses 180, 181, 184 and 185, however, the spars 134 and 135 should be considered the fixed elements, and the plates 178, which are integral parts of the wing structure, can be thought of as the movable elements. Actually, of course, the motion is relative, but the operation is more clearly understood by considering the fuselage 20 as the reference and considering the spars 134 and 135 as movable up and down with respect to the fuselage, and the wings 24 and 25 as movable with respect to the spars 134 and 135.

Because of the fact that the harnesses 180 and 184 are wrapped around the spar 134 from opposite sides, rotation of the spar 134 in a direction to move the trailing edge of the wing 25 downwardly will cause the trailing edge of the wing 24 to move upwardly. Similarly, rotation of the forward spar 135 will cause the leading edges of the wings 24 and 25 to move in opposite directions. When the spars 134 and 135 are rotated, therefore, the wing on one side of the airplane moves to a higher angle of attack while the wing on the opposite side moves in the opposite direction. This produces an aileron-like action for obtaining lateral control.

There are worm wheels 187 secured to the spars 134 and 135 at a location within the subcompartment 132; and these worm wheels 187 are rotated by worms 189 in the same way as the worm wheels 157 on the bearing sleeves 139 are rotated. The rearward worm wheel 187 is shown in FIGURE 7 and its worm 189 is attached to a shaft 191 driven by a motor 193. This motor is secured to the partition 126 by a bracket 195. A sprocket 198 secured to the shaft 191 transmits rotation of the shaft 191 to a corresponding shaft of the worm 189 (FIGURE 6) which drives the forward worm wheel 187.

The worms 189 provide irreversible driving connections between the motor 193 and the worm wheel 187, as already described in connection with the other worm wheels 157 for the bearing sleeves.

The worm wheels must be of large diameter with respect to the worms because up-and-down movement of the bearing sleeves 138 and 139 causes the worm wheels 157 and 187 to also move up and down so that the worms 159 and 189 have to operate on different portions of the circumferences of the worm wheels.

It will be evident that up-and-down movement of the bearing sleeves 138 and 139 also imparts similar-up-and-down movement to the worm wheels 187. Since these worm wheels 187 and their worms 189 provide an irreversible driving connection, as explained above, it is necessary to operate the motor that drives the worms 189 at the same time that the motor is operated to operate the worms that drive the worm wheels 157; but movement of the worm wheels 187 up and down in unison with the worm wheels 157, as the spars are raised and lowered, does not cause differential tilting of the wings. It is rotation of the worm wheels 187, when the worm wheels 157 are stationary, that causes the spars to rotate in the bearing sleeves 138 and 139, with resulting tilting of the different wings in opposite directions.

There is a frame 201 connected to the ends of the spars 134 and 135 in each of the wings 24 and 25. Each of these frames 201 has bearings 203 which fit over the ends of the spars to connect the frame 201 to the spars. At an intermediate location along each frame 201 there are axially spaced bearings 205 for supporting one end of a shaft 207. The boom 48 has a bracket 209 located at its upper ends and by which it is secured to the shaft 207 at a point intermediate the bearings 205. Thus any load from the boom 48 is transmitted through the bearings 205 and frame 201 directly to the spars 134 and 135.

At its inner end, the shaft 207 is supported in a bearing 211 carried by the partition 128. A worm wheel 213, attached to the shaft 207, is driven by a worm 215 from a motor 216. This worm drive is irreversible so that the boom 48 cannot rotate the shaft 207, but the shaft 207, which is preferably a hollow tube, is of substantial length and yields in torsion to provide a substantial spring effect which permits the boom 48 to move angularly to accommodate roughness in the ground over which it moves when in its lowered position. The structure and operating connections for the boom on both sides of the airplane is the same as that already described, and the controls operate both booms simultaneously, and independent of wing tilt.

There are openings 220 through the sides of the fuselage for the flow of air from the interior of the wings 24 and 25 into the subcompartments 132 and 133. From these subcompartments 132 and 133 the air is drawn out through the openings 124 in the rearward partition 122 by the action of auxiliary propeller, as already explained. In order to control the amount of air drawn out of each of the wings, means are provided for closing or partially closing the openings 220. In the construction illustrated, these means include air control flanges 222, each of which has a hub portion slideable along one of the shafts 207 toward and from one of the fuselage openings 220.

FIGURE 6 shows one of the flanges 222 in position to permit the flow of air from the interior of the wing 25 through the opening 220 and into the subcompartment 133. The other flange 222, however, is shown in position to obstruct the flow of air from the wing 24. By selectively operating these flanges 222, the lift of the respective wings 24 and 25 can be changed since these air control flanges affect the boundary layer control of the wings by varying the amount of suction available for boundary layer control.

The air control flanges 222 are moved back and forth along the shaft 207 by push rods 225 under the control of the pilot through motion transmitting connections not shown. These push rods 225 are merely representative of means for sliding the air control flanges 222 toward and from the openings 220 to obtain boundary air control or aileron-like action.

Operation of the Invention

For take-off, the airplane is brought first to a position of minimum drag, the wing being set at about (−2°) to the ground and for better vision and to have the tail further away from the ground, the fuselage is tilted to about 5° nose down. For drag reduction, the tail section is kept in a horizontal position.

The engine is then opened wide and the airplane starts to run. By a slight elevator motion of the tail section, the front wheel 44 (FIGURE 3) is made to leave the ground and the airplane rolls on its one main wheel 40. When the invention is incorporated into a small plane, a speed of 20 to 30 miles an hour is reached within ten seconds and after a run of not over two hundred feet. At this speed the airplane will leave the ground if the wings are tilted to a predetermined angle of climb.

This tilting of the wings to a higher angle of attack is accomplished by rotating the bearing sleeves 138 and 139 (FIGURE 6) so as to raise the forward spar 135 and to depress the rearward spar 134. This movement of the spars 134 and 135 causes the wings to rotate about a center midway between the spars and approximately on the axes of the shafts 207. Thus the tilting movement of the wings does not affect the positions of the booms 48. These booms are retracted as soon as the airplane has sufficient velocity for lateral stability, and the booms are telescoped to reduce their length. The change in the angle of the wings does not affect the angle of the fuselage. This results in good visibility for the pilot at all times and is an especially important advantage of the invention at take-off and when coming in for a landing with the wings at a high angle of attack. Landings are made under power, the airplane approaching the selected landing spot with the wings tilted to an angle of attack of from 20 to 30° and with the fuselage body nosing downward at an angle of 5 to 15°, which angle is obtained by operating the tail section in an up-and-down direction for elevator effect.

At such a steep angle of attack, a maximum lift and a minimum speed is obtained, the wings acting as a forceful airbrake, and the lift being increased greatly by the ground effect as the plane settles to the ground for a slow and short, glider-like, pancake landing.

As previously explained stalling is avoided by the boundary layer control, both of the air control flanges 222 (FIGURE 6) being in their wide open positions to permit maximum suction of air from the wings. By making the landings under power, the suction of air from the wings is maintained at a high value. The auxiliary propeller is preferably a variable pitch propeller to provide further control of the suction. With the boundary layer control of this invention stalling is avoided even though the wings are tilted up at such high angles of attack that the plane lands in a manner similar to a bird.

It is in making such landings and at take-off that the tilting of the wings is of particular advantage. Even if a conventional fixed-wing air-plane had boundary layer control which would permit unusually high angles of attack, the tilting upward of the nose of the plane would destroy the ground visibility for the pilot, and would require an abnormally high landing gear to prevent the tail from hitting the ground. Such landing gear would be hardly feasible to retract. With this invention, however, the fuselage can be actually tilted downwardly, as already described, while the wings are at a high angle of attack, thus affording the pilot the greatest possible visibility of the ground immediately ahead of the plane. This may be essential for safety when operating on an unprepared field because obstructions may become visible at close range which the pilot could not see from a distance, and with the visibility afforded by this invention, it is possible for the pilot to shift his course as necessary to avoid such obstructons.

When the airplane is in the air, it is piloted in the same way and by the same means as any conventional plane, though the wings themselves are tilted by conventional means in opposite directions instead of having ailerons as in conventional airplanes. The elimination of ailerons and flaps, by use of this invention, reduces the weight of the wings, eliminates hinge connections, and makes possible the construction of each wing as a single monocoque unit suitable for manufacture of fibre glass, or other selected material. This clean wing structure, free of ailerons, makes possible the extension of the boundary layer control over all critical areas of the wing and especially over the locations where the ailerons are usually placed. It is at the wing tips that stalling burble starts.

By swinging the tail section 22 in directions to change the line of the propeller thrust, the airplane of this invention operates without requiring a rudder or elevators. The steering is comparable to that of an outboard motor boat. The ring 86 (FIGURE 3) serves to some extent as a rudder and elevator, and so do the fins on the tail section, depending upon the direction in which it is displaced as it moves as a unit with the tail section. These control surfaces are sufficient for landing with a dead engine. However, the principal rudder and elevator effects in normal operation result from changing the direction of thrust of the slip stream from the propeller, or the jet thrust when a turbo jet engine is used, and this has the outstanding advantage of being equally effective when the plane is moving at low speeds as when moving rapidly. Conventional aerodynamic control surfaces depend largely upon the air speed of the aircraft for their effect and thus become less and less effective as the speed of the plane is reduced when landing and at take-off.

This effective elevator and rudder control, independent of air speed, is particularly important for a plane which is designed to land and take-off at low speeds; and it promotes the safety of the plane by providing quickly responsive controls when operating in close quarters.

Although the invention has been illustrated as applied to a small plane, it can be used in a plane of any size and many features can be used on multi-engine craft where the application of the invention can include separate tail sections for the separate engine units, or with one tail section behind the fuselage and additional engines of any kind on the wings.

From the foregoing description it will be apparent that this invention provides a monocoque wing construction and by constructing the wing of fibre glass, the aircraft has unobstructed inner, and smooth inner and outer surfaces, ideally suited for the flow of the boundary layer control air. With this fibre glass monocoque wing construction, an advantageous strength-weight ratio is obtained. By making the wing of fibre glass monocoque construction, the invention provides a practical aircraft even though the modulus of elasticity of fibre glass is low, and even though a stiff connection of the wings to the fuselage is desirable for the wing tilting features. By making the spars of this invention out of metal having a high modulus of elasticity, a rigid connection is obtained; and both wings and fuselage can be made out of fibre glass with as much stiffening of the root portion of the wings as is desirable. One of the outstanding advantages of the fibre glass is the eliminating of the multitude of parts and components required in metal aircraft.

It will be apparent further that the flow of air for boundary layer control is obtained without the necessity of any heavy, bulky, auxiliary power equipment. A piston engine requires air for cooling and when this invention utilizes such an engine, the same air is used for both boundary layer control and engine cooling, and utilizes the same auxiliary propeller for creating the suction of air from the wings and across the engine. The auxiliary propeller may be of variable pitch for regulating the amount of air drawn from within the wings. This cooling air is ejected through the propeller disk raising the total thrust of the aircraft.

This invention can be used with any kind of engine, such as a piston engine, turbo-jet or turbo-prop, and air for cooling, or for combustion, or both, or any air required for other purposes can be taken, in whole or in part, from within the wing for operation of the boundary layer control. The amount of air taken from within the wings is regulatable, and when the amount of air taken from the wings is reduced, a by-pass for air to the engine can be provided.

The provision of a tail unit, including the engine and propeller, at the extreme rearward end of the fuselage, in an aircraft which has the cabin at the forward end of the fuselage, reduces both engine and propeller noise in the cabin; and propeller noise is still further reduced by the provision of the shrouding ring coaxial with the propeller.

Various changes and modifications can be made in the construction illustrated without departing from the invention as defined in the claims.

What is claimed is:

1. An aircraft for low speed landing and take-off including a fuselage, hollow wings connected to the fuselage, bearings on which the wings are tiltable with respect to the fuselage to different angles of attack, a tail section of the fuselage, a universal connection between the tail section and the forward portion of the fuselage and on which the tail section has swivel movement with respect to said forward portion, and a thrust producer carried by the tail section and movable as a unit with the tail section to change the direction of thrust and to obtain components of thrust transverse of the direction of movement of the aircraft independent of forward speed, boundary layer controls for air flow over the wing surfaces including passages through which air is admitted into the hollow interiors of the wings, said wings having spanwise-extending passages at chordwise-spaced locations and through which air flows from within the wings to prevent stalling at high angles of attack.

2. The aircraft described in claim 1 and in which there is landing gear retractable into the aircraft and all of which is located under the fuselage.

3. The aircraft described in claim 2 and in which the retractable landing gear is a wheel at the spanwise center of the aircraft movable into and out of a compartment in the lower portion of the fuselage, and there are booms connected to the wings at some distance from the fuselage, the booms being movable from a lowered position from which they extend angularly rearwardly into contact with the ground for preventing tilting of the aircraft when on the ground, and means for swinging the booms into rearwardly-extending horizontal positions when the aircraft is in flight.

4. The aircraft described in claim 1 and in which the thrust producer includes an engine and a propeller, both of which are carried by the tail section and tiltable as a unit with the tail section.

5. The aircraft described in claim 1 and in which the thrust producer is movable on said universal connection with angular movement in any direction from a spanwise axis, and the aircraft includes means for limiting angular movement of the assembly in all directions to an angle less than 25° from said axis.

6. The aircraft described in claim 1 and in which the aircraft has control means for obtaining rudder and elevator effects, and said control means are connected to the tail section and operate to swing the tail section horizontally for rudder effect and vertically for elevator effect.

7. The aircraft described in claim 1 and in which the thrust producer is a propeller and there is a shroud around the propeller constituting an air control surface for operation as a rudder when the tail section swings about a vertical axis and as an elevator when the tail section swings about a spanwise horizontal axis.

8. The aircraft described in claim 1 and in which there are means for tilting the wings on both sides of the fuselage in the same direction and other means for tilting the wings differentially in opposite directions to obtain an aileron effect.

References Cited in the file of this patent

UNITED STATES PATENTS

| | | |
|---|---|---|
| 1,309,710 | Webb | July 15, 1919 |
| 1,710,137 | Bankston | Apr. 23, 1929 |
| 1,768,696 | Laddon | July 11, 1930 |
| 1,824,882 | Fritz | Sept. 29, 1931 |
| 1,980,233 | Stout | Nov. 13, 1934 |
| 2,384,296 | Gluhareff | Sept. 4, 1945 |
| 2,470,348 | Haight | May 17, 1949 |
| 2,510,561 | De Laval | June 6, 1950 |
| 2,511,504 | Hawkins | June 13, 1950 |
| 2,625,347 | Froling | Jan. 13, 1953 |
| 2,668,026 | Price | Feb. 2, 1954 |
| 2,751,168 | Stalker | June 19, 1956 |
| 2,793,827 | Ries | May 28, 1957 |

FOREIGN PATENTS

| | | |
|---|---|---|
| 421,051 | France | Dec. 10, 1910 |
| 597,674 | France | Sept. 7, 1925 |
| 43,957 | France | July 9, 1934 |
| 479,598 | Great Britain | Feb. 7, 1938 |
| 702,926 | Germany | Feb. 24, 1941 |
| 983,334 | France | Feb. 7, 1951 |

OTHER REFERENCES

Aviation News, page 22, Nov. 11, 1946.
Aviation Week, page 38, Sept. 29, 1952.